US007369997B2

(12) United States Patent
Chambers et al.

(10) Patent No.: US 7,369,997 B2
(45) Date of Patent: May 6, 2008

(54) CONTROLLING SPEECH RECOGNITION FUNCTIONALITY IN A COMPUTING DEVICE

(75) Inventors: Robert Chambers, Sammamish, WA (US); Charlton E. Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 886 days.

(21) Appl. No.: 09/918,723

(22) Filed: Aug. 1, 2001

(65) Prior Publication Data

US 2003/0028382 A1    Feb. 6, 2003

(51) Int. Cl.
*G10L 11/00* (2006.01)
(52) U.S. Cl. ...................................... 704/275
(58) Field of Classification Search ................ 704/235, 704/270, 275; 345/348, 978, 533, 163–168
See application file for complete search history.

(56) References Cited

U.S. PATENT DOCUMENTS

| 4,658,097 | A | * | 4/1987 | D'Agosto et al. ............ 379/75 |
| 5,386,494 | A | * | 1/1995 | White ..................... 704/270.1 |
| 5,799,279 | A | * | 8/1998 | Gould et al. ................ 704/275 |
| 5,801,689 | A | * | 9/1998 | Huntsman ................... 715/733 |
| 5,818,800 | A | * | 10/1998 | Barker .................... 369/29.02 |
| 5,819,225 | A | * | 10/1998 | Eastwood et al. ........... 704/275 |
| 5,893,063 | A | * | 4/1999 | Loats et al. ................ 704/275 |
| 5,897,618 | A | * | 4/1999 | Loats et al. ................ 704/275 |
| 5,920,836 | A | * | 7/1999 | Gould et al. ................ 704/251 |
| 5,920,841 | A | * | 7/1999 | Schottmuller et al. ...... 704/275 |
| 5,950,167 | A | * | 9/1999 | Yaker ......................... 704/275 |
| 5,956,298 | A | * | 9/1999 | Gough .................... 369/29.01 |
| 5,969,708 | A | * | 10/1999 | Walls ......................... 715/857 |
| 6,075,534 | A | * | 6/2000 | VanBuskirk et al. ........ 715/835 |
| 6,088,671 | A | * | 7/2000 | Gould et al. ................ 704/235 |
| 6,144,938 | A | * | 11/2000 | Surace et al. ............... 704/257 |
| 6,161,087 | A | * | 12/2000 | Wightman et al. .......... 704/215 |
| 6,330,540 | B1 | * | 12/2001 | Dischler ..................... 704/275 |
| 6,334,103 | B1 | * | 12/2001 | Surace et al. ............... 704/257 |
| 6,353,809 | B2 | * | 3/2002 | Takahashi et al. .......... 704/235 |
| 6,408,272 | B1 | * | 6/2002 | White et al. ............. 704/270.1 |
| 6,424,357 | B1 | * | 7/2002 | Frulla et al. ................ 715/728 |
| 6,498,601 | B1 | * | 12/2002 | Gujar et al. ................ 345/173 |
| 6,748,361 | B1 | * | 6/2004 | Comerford et al. ......... 704/275 |
| 6,839,669 | B1 | * | 1/2005 | Gould et al. ................ 704/246 |
| 6,956,591 | B2 | * | 10/2005 | Lundin et al. .............. 345/684 |

OTHER PUBLICATIONS

Lernout & Hauspie™, Dragon Systems, Dragon Naturally Speaking[5]® User's Guide, Aug. 2000, pp. 1-215 (double-sided), author and publication location unknown.

* cited by examiner

*Primary Examiner*—Michael Opsasnick
(74) *Attorney, Agent, or Firm*—Birch, Stewart, Kolasch & Birch, LLP (57) ABSTRACT

A system and method for use in computing systems that employ speech recognition capabilities is provided. Where recognized speech can be dictation and commands, one or more buttons may be used to change modes of said computing systems to accept spoken words as dictation, or to accept spoken words as commands, as well as activate a microphone used for the speech recognition. The change in mode may occur responsive to the manner in which a button is pressed, where the manner may include such depressions as taps, press and holds, thumbwheel slides, and other forms of button manipulation.

19 Claims, 10 Drawing Sheets

CONTROLLING SPEECH RECOGNITION FUNCTIONALITY IN A COMPUTING DEVICE

TECHNICAL FIELD

The present invention relates generally to computing devices employing voice and/or speech recognition capabilities. More specifically, the present invention relate to systems and methods for allowing a user to control the operation of the voice and/or speech recognition capability, including the activation/deactivation of a microphone, and the switching between various modes of speech/voice recognition. Furthermore, aspects of the present invention relate to a portable computing device employing speech and/or voice recognition capabilities, and controlling those abilities in an efficient manner.

BACKGROUND OF THE INVENTION

In what has become known as The Information Age, computer use is an everyday part of our lives. Naturally, innovators and developers are engaged in a never-ending quest to provide new and improved ways in which computers can be used. In one such innovation, software and hardware have been developed that allow a computer to hear, and actually understand, words spoken aloud by a user. Such systems are generally referred to as speech recognition or voice recognition systems, and are currently available on the market.

Speech/voice recognition systems generally do one of two things with recognized words or phrases. First, the system may treat the spoken words or phrases as a dictation, transcribing the spoken words or phrases into text for insertion into, for example, a word processing document. Such a system would allow a user to create a document, such as a letter, by speaking aloud the letter's desired contents. Second, the system may treat the spoken words or phrases as commands or instructions, which are then carried out by the user's computer. For example, some speech recognition systems allow a user, who is dictating a letter, to orally instruct the computer to delete or replace a previously-spoken word or phrase.

If a system is to accept both dictation and commands from the user, there needs to be a way for the computer to recognize whether a spoken word is to be treated as a dictation and transcribed, or as a command and carried out. For example, a user who repeats the phrase "delete the last word" might intend to add the phrase "delete the last word" to a document he or she is dictating, or the user might actually want to delete the previous word from a document. In commercially-available systems that offer dictation and command modes a user can give the computer an indication as to whether a spoken word or phrase is to be treated as a command or dictation. This indication is often done through use of the computer keyboard, which can often have over 100 keys, and may use keys such as the "CTRL" or "SHIFT" keys for controlling command or dictation. Other keys or physical switches are then used to control the on/off state of the microphone. For example, the Dragon NaturallySpeaking® speech recognition program, offered by Dragon Systems, Inc., allows users to use keyboard accelerator commands such that one key (e.g., the CTRL or SHIFT) might be used to inform the system that spoken words are to be treated as dictation, while another key informs the computer to instruct spoken words as commands. In use, the user simply presses one of these keys to switch between dictation and command "modes," while another key press or switch is used to activate or deactivate the microphone.

These existing speech recognition systems, however, have heretofore been designed with certain assumptions about the user's computer. To illustrate, the example described above assumes that a user has a fully-functional keyboard with alphabet keys. Other systems may use onscreen graphical controls for operation, but these systems assume that a user has a pointing device (e.g., a mouse, stylus, etc.) available. Such speech recognition systems are problematic, however, when they are implemented on a user's computer where such user input capabilities are unavailable or undesirable. For example, a portable device (e.g., handheld personal data assistant, etc.) might not always have a full keyboard, mouse, or stylus available. In order to use these existing speech recognition systems on such devices, a user might be required to attach an external keyboard and/or mouse to his or her portable device, complicating the user's work experience and inconveniencing the user. Furthermore, the separate control of the microphone on/off state is often cumbersome. Accordingly, there is an existing need for a more efficient speech recognition system that allows for simplified control by the user.

SUMMARY OF THE INVENTION

According to one or more aspects of the present invention, a novel and advantageous user control technique is offered that simplifies the use of speech recognition capabilities on a computing device. In one aspect, user control over many aspects of the speech recognition system (such as controlling between dictation and command modes) may be achieved using a single button on a user's device. In further aspects, the manner and/or sequence in which a button is manipulated may cause the speech recognition system to activate and/or deactivate a microphone, enter a dictation mode, enter a command mode, toggle between command and dictation modes, interpret spoken words, begin and/or terminate speech recognition, and/or execute a host of other commands. In some aspects, a press and release (e.g., a tap) of the button may be interpreted to have one meaning to the system, while a press and hold of the button may be interpreted to have another meaning.

The user's device may have a multi-state button, in which the button might have multiple states of depression (e.g., a "partial" depression, and a "full" depression). The various states of depression of the multi-state button may each have distinct meanings to the speech recognition system, and may cause one or more of the above-identified functions to be performed.

The user's device may have two buttons used for input, where the manner in which one or both of the buttons are pressed is used to cause distinct behavior in the speech recognition system. Furthermore, a device may have two buttons used for controlling the activation state of a microphone. In further aspects, other forms of user input mechanisms may be used to control this behavior.

Feedback may be provided to the user following successful entry of a command using, for example, one or more buttons. Such feedback may include visual feedback and/or audio feedback.

BRIEF DESCRIPTION OF THE DRAWINGS

FIG. 5 illustrates a state diagram for an example aspect of the present invention, while

DETAILED DESCRIPTION OF EMBODIMENTS OF THE INVENTION

Figure 1:
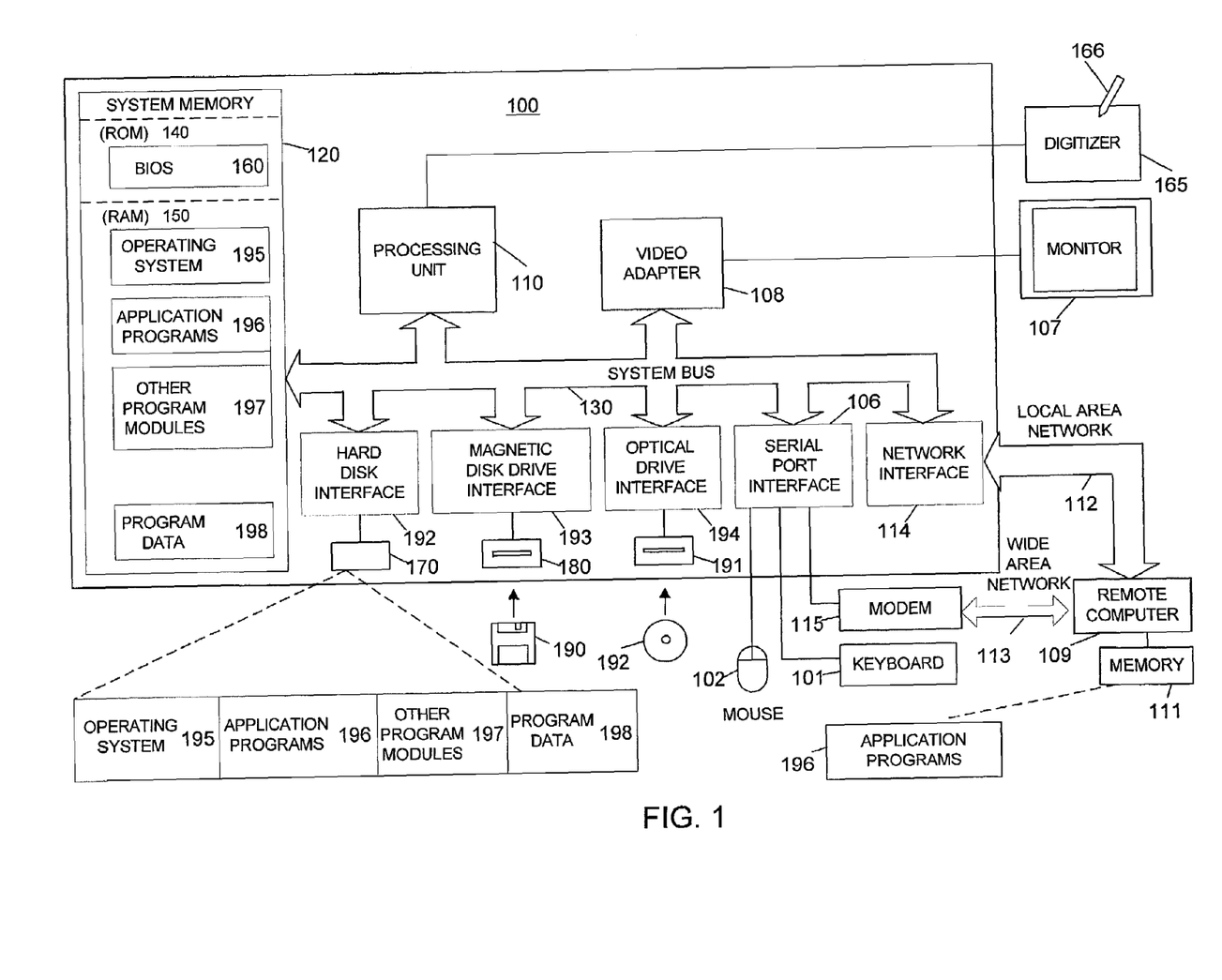
FIG. 1 illustrates a schematic diagram of a computing device on which one or more aspects of the present invention may be implemented.

The present invention may be more readily described with reference to FIGS. 1-4. FIG. 1 illustrates a schematic diagram of a conventional general-purpose digital computing environment that can be used to implement various aspects of the present invention. A computer 100 may include a processing unit 110, a system memory 120 (read-only memory 140 and/or random access memory 150), and a system bus 130.

A basic input/output system 160 (BIOS), containing the basic routines that help to transfer information between elements within the computer 100, such as during startup, is stored in the ROM 140. The computer 100 may also include a basic input/output system (BIOS), one or more disk drives (such as hard disk drive 170, magnetic disk drive 180, and/or optical disk drive 191) with respective interfaces 192, 193, and 194. The drives and their associated computer-readable media provide storage (such as non-volatile storage) of computer readable instructions, data structures, program modules and other data for the personal computer 100. For example, the various processes described herein may be stored in one or more memory devices as one or more program modules, routines, subroutines, software components, etc. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment. These elements may be used to store operating system 195, one or more application programs 196, other program modules 197, program data 198, and/or other data as needed.

A user can enter commands and information into the computer 100 through various input devices such as a keyboard 101 and pointing device 102. Other input devices (not shown) may include a microphone, joystick, game pad, satellite dish, scanner or the like. Output devices such as monitor 107, speakers and printers may also be included.

The computer 100 can operate in a networked environment having remote computer 109 with, for example, memory storage device 111, and working in a local area network (LAN) 112 and/or a wide area network (WAN) 113.

Although FIG. 1 shows an exemplary environment usable with the present invention, it will be understood that other computing environments may also be used. For example, the present invention may use an environment having fewer than all of the various aspects shown in FIG. 1 and described above, and these aspects may appear in various combinations and sub-combinations that will be apparent to one of ordinary skill.

Figure 2:
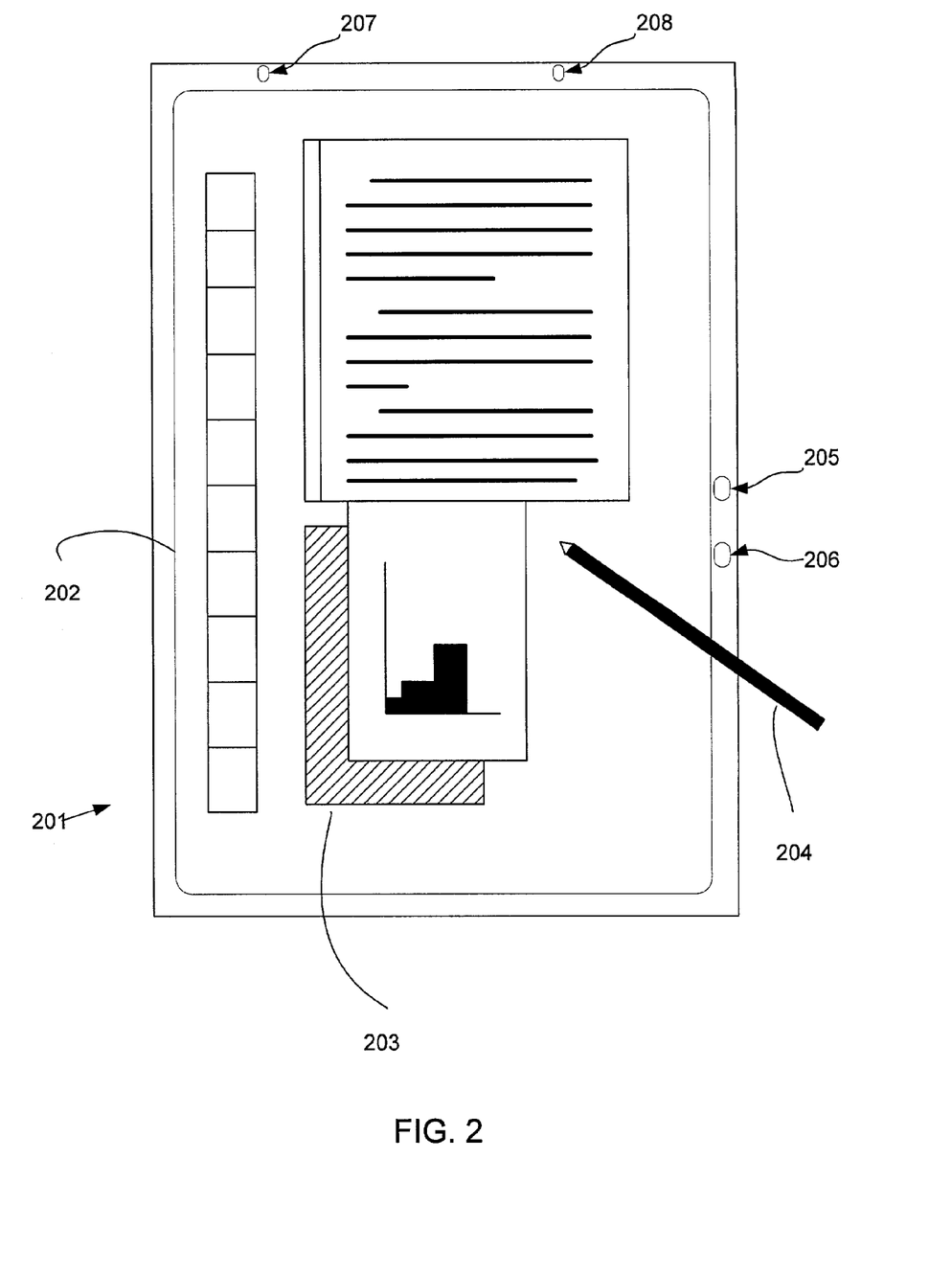
FIG. 2 illustrates a personal computer device on which one or more aspects of the present invention may be implemented.

FIG. 2 illustrates a portable computing device 201 that can be used in accordance with various aspects of the present invention. Any or all of the features, subsystems, and functions in the system of FIG. 1 can be included in the computer of FIG. 2. Portable Device 201 may include a large display surface 202, e.g., a digitizing flat panel display and a liquid crystal display (LCD) screen, on which a plurality of windows 203 may displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Device 201 interprets marks made using stylus 204 in order to manipulate data, enter text, and execute conventional computer application tasks such as spreadsheets, word processing programs, and the like.

A stylus could be equipped with buttons or other features to augment its selection capabilities. A stylus could be implemented as a simple rigid (or semi-rigid) stylus. Alternatively, the stylus may include one end that constitutes a writing portion, and another end that constitutes an eraser end which, when moved across the display, indicates that portions of the display are to be erased. Other types of input devices such as a mouse, trackball, or the like could be used. Additionally, a user's own finger could be used to select or indicate portions of the displayed image on a touch-sensitive or proximity-sensitive display. Aspects of the present invention may be used with any type of user input device or mechanism for receiving user input.

Device 201 may also include one or more buttons 205, 206 to allow additional user inputs. Buttons 205, 206 may be of any type, such as pushbuttons, touch-sensitive buttons, proximity-sensitive buttons, toggle switches, thumbwheels, combination thumbwheel/depression buttons, slide switches, lockable slide switches, multiple stage buttons etc. Buttons may be displayed onscreen as a graphical user interface (GUI). The device 201 may also include one or more microphones 207 used to accept audio input. Microphone 207 may be built into the device 201, or it may be a separate device connected by wire or other communications media (e.g., wireless). Furthermore, device 201 may include one or more lighting devices 208, such as light-emitting diodes or light bulbs, that may be used to provide additional feedback to the user.

Figure 3:
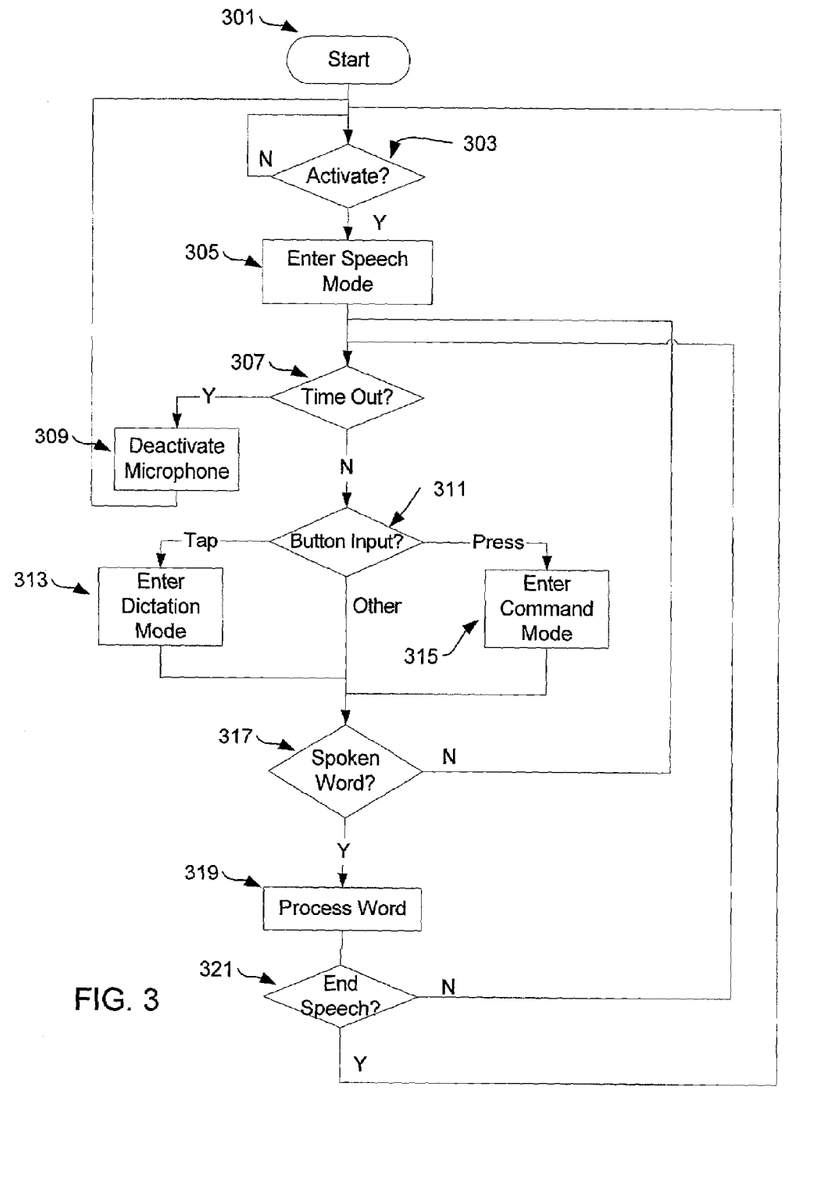
FIG. 3 shows an example flow diagram of a speech recognition control process according to one aspect of the present invention.

FIG. 3 depicts a flow diagram for one aspect of the present invention, in which a tap of a button on the user's device may place the device in a dictation mode, while a press and hold of the button may place the device in a command mode. As will be discussed below, if the device is in a dictation mode, recognized spoken words or phrases may be processed by the device as text, and inserted into an electronic document, such as a word processing file, an email, or any other application using textual information. In a command mode, recognized spoken words or phrases may result in one or more corresponding functions being performed or executed by the device.

The various steps depicted in the flow diagram represent processes that may be executed, for example, by one or more processors in the user's computing device as the speech recognition feature is used. In FIG. 3, the process begins at step 301, and proceeds to step 303 in which a determination is made as to whether the speech recognition feature is to be activated. This determination may depend on a variety of factors, depending on the particular desired embodiment. In some aspects of the present invention, the speech recognition mode is not activated until a user enters a particular command to the system, such as executing a software program. In other aspects, the speech recognition mode may be activated upon a particular depression sequence of one or more buttons. Alternatively, the speech recognition system may automatically be activated upon startup of the user's device.

If, in step 303, the necessary condition for activating the speech recognition mode has not occurred, this portion of the system will simply remain in step 303 until the condition occurs. Once the condition does occur, the process moves to step 305, in which the necessary functions for activating the speech recognition capabilities may occur. Such functions may include activating one or more microphones, such as microphone 207. Since a microphone uses power in an activated state, the microphone may remain deactivated until the speech recognition system or software is initiated to conserve power. Alternatively, the microphone may be active even before the speech recognition system is initiated. Such a microphone may allow audio inputs to the user's device even without the speech recognition software, and may improve response time for the user. Furthermore, the speech recognition system may automatically be active upon startup, in which case the microphone may automatically be activated.

Step 305 may include the function of establishing a mode for the speech recognition. For example, upon startup, the speech recognition system may assume that it is in command mode, and that spoken words or phrases are to be interpreted as commands. Alternatively, the speech recognition system may automatically start in a dictation mode, in which spoken words or phrases are interpreted as text to be added to an electronic document. Step 305 may also initiate various software processes needed by the speech recognition system, such as a timeout process that monitors the amount of time passing between detected words or phrases.

Once the speech recognition system software is initiated, the system may then check, in step 307, to determine whether a time out has occurred. A time out is an optional feature, and as mentioned above, may involve a timer that monitors the amount of time passing between detected words or phrases. If implemented, the timeout feature may conserve electrical power by deactivating a microphone and/or exiting the speech recognition mode if no spoken words or phrases are detected after a predetermined amount of time. A timeout may occur if no words or phrases are detected for a period of two (2) minutes. Alternatively, a timeout may occur after a smaller amount of time (e.g., one minute), or a longer period of time (e.g., 3, 5, 7, 10, 20 minutes, etc.). The time period may depend on the particular implementation, the nature of the available power source, and may be user-defined.

If, in step 307, a timeout has indeed occurred, the process may proceed to step 309, in which one or more microphones may be deactivated. The process may also terminate the speech recognition software processes, and return to step 303 to await another activation of the speech recognition software.

If no timeout has yet occurred in step 307, the process may move to step 311 to await general input from the user. In FIG. 3, a single button may be used for controlling the speech recognition software, and step 311 may simply await input on that button, proceeding depending on the manner the button was pressed, or the type of button depression. If, in step 311, the button is tapped, then the process may proceed to step 313, in which the speech recognition software enters a dictation mode. In the dictation mode, spoken words may be interpreted as text, to be added to an electronic document (such as a word processing document, an email, etc.). A tap of the button may be defined in numerous ways. For example, a tap may be defined as a press of the button, where the button is pressed for a period of time smaller than a predefined period of time. This predefined period of time may be 500 milliseconds, one second, two seconds, three seconds etc., and would depend on the quickness to be required of a user in tapping a button, as well as the particular type of button used (e.g., some buttons may be slower than others, and have limits as to how quickly they can be pressed and released).

If a button is pressed and held in a depressed state for a time greater than a predetermined time, the input may be considered in step 311 to be a press and hold input. The predetermined time required for a press and hold may also vary, and may be equal to the predetermined time used for a button tap, as described above. For example, a button that is pressed for less than two seconds might be considered a tap, while a button that is pressed for more than two seconds might be considered a press and hold. If, in step 311, a press and hold was detected, then the process may move to step 315, which may place the speech recognition software in a command mode. In the command mode, spoken words may be interpreted by the system as commands to be executed. After a tap or press and hold is handled, or if the button is neither tapped nor pressed and held, the process may move to step 317.

In step 317, a check may be made to determine whether received audio signals have been interpreted to be a spoken word or phrase. If no spoken words or phrases have yet been completed or identified, the process may return to step 307 to test for timeout. This may occur, for example, when the user has started, but not yet completed, a spoken word or phrase. In such a case, the process would return to step 307, retaining signals indicating what the user has spoken thus far.

If, in step 317, a spoken word or phrase has been successfully received and identified by the system, the process may move to step 319 to handle the identified word or phrase. The actual processing in step 319 may vary depending on, for example, the particular mode being used. If the system is in a dictation mode, then the received and identified spoken word or phrase may be interpreted as text, and transcribed into an electronic document such as a word processing document, email, temporary text buffer, phone dialer, etc. If, on the other hand, the system were in a command mode, the step 319 processing may consult a database to identify a particular command or function to be performed in response to the received command word or phrase. Command words or phrases may be used to execute any number of a variety of functions, such as initiating another program or process, editing documents, terminating another program or process, sending a message, etc.

In step 321, a check may be made to determine whether the speech recognition system has been instructed to terminate. Such an instruction may come from a received command word or phrase handled in step 319, or may come from some other source, such as a different user input to a button, onscreen graphical user interface, keyboard, etc. If the speech recognition system has been instructed to terminate, the process may move to step 303 to await another activation of the system. If the speech recognition system has not yet been instructed to terminate the process may move to step 307 to determine whether a time out has occurred. Steps 321, 319, or 317 may also include a step of resetting a timeout counter.

The example process depicted in FIG. 3 is merely one aspect of the present invention, and there are many variations that will be readily apparent given the present discussion. For example, although the types of button presses depicted in FIG. 3 include taps and press and holds, further aspects of the present invention may use any form or mechanism for user input to switch between dictation and command modes. For example, from step 311, a tap may lead to step 315 and a press and hold may lead to step 313. As another example, a button sequence may include multiple sequential taps, or a sequence of presses and holds. The system may receive input from a multiple stage button, and use partial depressions, full depressions, and sequences of these depressions to switch between command and dictation modes. Similarly, the system may use a thumbwheel switch, and use rotations of the button (e.g., clockwise or counter-clockwise), depressions of the switch, or sequences of rotations and depressions. The system may use a sliding switch, which may allow for easier use of the press and hold input. The system may also use proximity-sensitive buttons to switch between dictation and command modes through, for example, hovering time and distance over a button. The system may also use audio inputs to switch between command and dictation modes. For example, predefined sounds, words, sequences, and/or tones may be used to alert the system that a particular mode is needed.

Other modifications to the FIG. 3 process may also be used. For example, steps 317 and 311 may be combined as a single step, allowing for the identification of spoken words simultaneously with the detection of button inputs.

Figure 4:
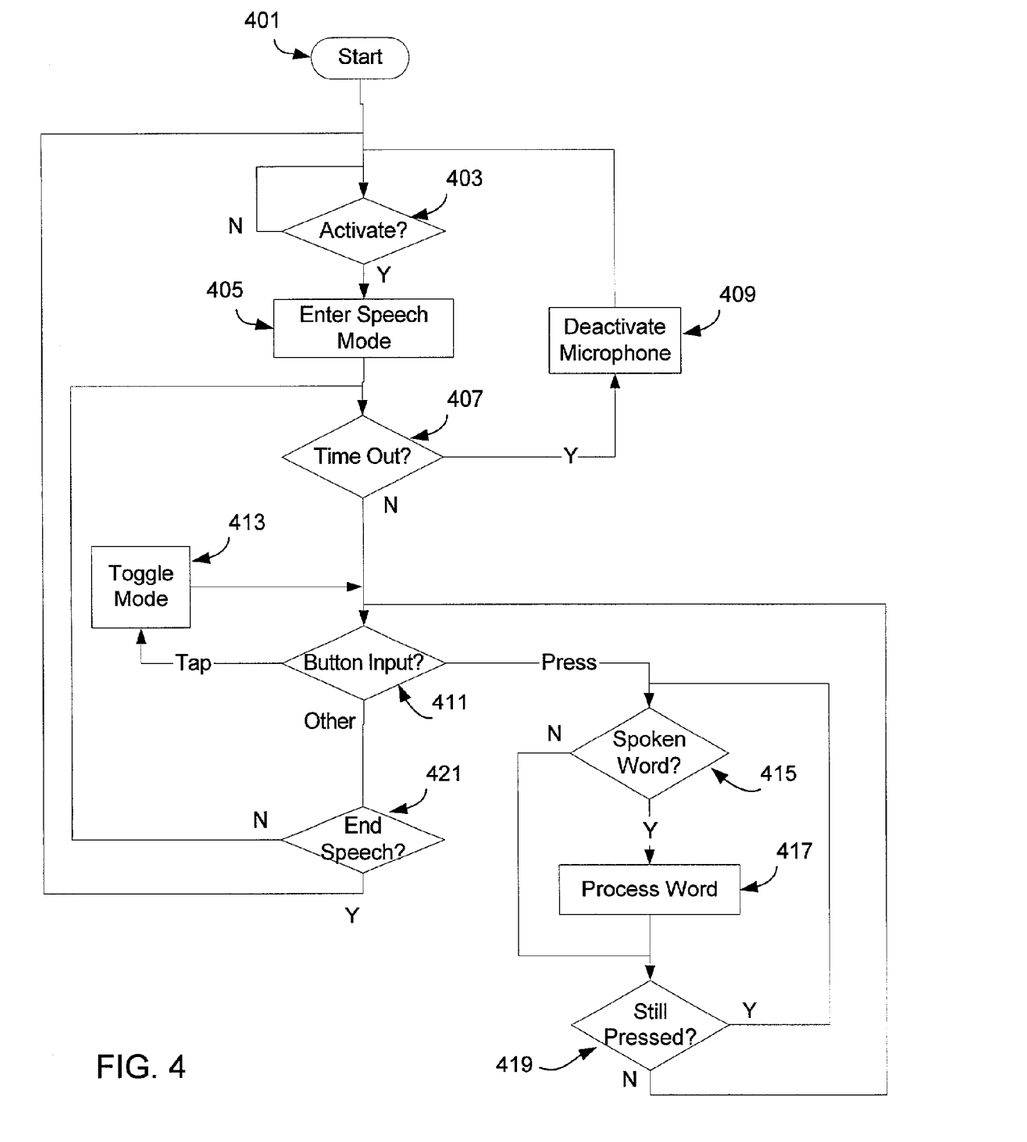
FIG. 4 shows an example flow diagram of a speech recognition control process according to a second aspect of the present invention.

FIG. 4 shows a process flow for another aspect of the present invention, in which the tap and press and hold button manipulations may be handled differently from the FIG. 3 approach. Indeed, many of the steps shown in FIG. 4 have counterparts in the FIG. 3 process, and may be similar or identical. The FIG. 4 method allows a tap of the button to toggle between dictation and command modes of speech recognition, while the press and hold of the button may allow the actual speech recognition to occur. One advantage that may be achieved using the FIG. 4 approach allows for the device to avoid attempting to recognize extraneous sounds attempting speech recognition when the button is held down. Although the FIG. 3 process may be more advantageous in situations where, for example, the user anticipates an extended session of using the device's speech recognition features, the FIG. 4 process is similar to that of traditional "walkie talkie" radio communication devices, and may be more familiar to users.

The FIG. 4 process begins in step 401, and moves to step 403, where the system awaits the necessary instructions for initiating the speech recognition features of the computer system. As with the FIG. 3 process described above, the speech recognition features may be activated in step 403 by a user using, for example, a button entry, a keyboard entry, an entry with a mouse or pointer, etc. Alternatively, the speech recognition may be activated automatically by the computer, such as upon startup. When the conditions necessary for initiating the speech recognition features are satisfied, the process moves to step 405, where necessary functions and/or processes may be initiated to carry out the actual speech recognition feature. These functions enable the device to enter a speech recognition mode, and may include the activation of a microphone, the entry of a default speech recognition mode (e.g., a command or dictation mode), and/or any of a number of other processes. In some aspects of the present invention, the speech recognition system defaults to a command mode.

With the speech mode enabled, the process may move to step 407, where a check is made to determine whether a predetermined amount of time has passed since a spoken word or phrase was recognized by the system. This timeout is similar to that described above with respect to step 307. If a timeout has occurred, then the process may deactivate the microphone and/or terminate the speech recognition process in step 409, and return to step 403 to await the next initiation of the speech recognition process.

If no timeout has occurred in step 407, then the process may move to step 411 to determine whether a user input has been received on the button. If a tap is received, the process may move to step 413, where a current mode is toggled between dictation and command modes. After the mode is toggled, the process may then return to step 411.

If, in step 411, the button is pressed and held, then the process may move to step 415 to determine whether a spoken word or phrase has been recognized by the speech recognition process. If a spoken word or phrase has been recognized, the process may move to step 417, in which the recognized word or phrase may be handled. As in the FIG. 3 process, this handling of a recognized word or phrase may depend on the particular mode of speech recognition. If in a dictation mode, the recognized word or phrase may simply be transcribed by the device into electronic text, such as in a word processor, email, or other document. If the speech recognition system is in a command mode, one or more functions corresponding to the recognized word or phrase may then be performed by the device.

If, in step 415, no spoken word or phrase has yet been identified, the process may move to step 419 to determine whether the button remains pressed. If the button is still pressed, the process may move to step 415 to check once again whether a complete spoken word or phrase has been recognized.

If, in step 419, the button is no longer pressed, then the process may move to step 411 to await further user inputs and/or speech. From step 411, the process may move to step 421 if no tap or press and hold is received, to determine whether the speech recognition process has been instructed to cease its operation. Such an instruction may come from the user through, for example, activation of another button on a graphical user interface, or the instruction may come from the user's device itself. For example, speech recognition functions may automatically be terminated by the device when battery power runs low, or when system resources are needed for other processes. If the speech recognition process has been instructed to terminate, then the process may move to step 403 to await activation. If, however, the speech recognition process has not been instructed to cease identifying speech, then the process may return to step 407 to once again determine whether a timeout has occurred.

In the FIGS. 3 and 4 methods, certain behavior occurs responsive to the tap or press and hold of a button on the user's device. This same behavior may be attributed instead to depression of one of a plurality buttons. For example, pressing one button might cause the behavior attributed to a tap in the above processes to occur, while pressing another button might cause the behavior attributed to a press and hold in the above processes to occur. To show an example, the terms "tap" and "press" appearing in FIGS. 3 and 4 may be substituted, for example, with "press button 1" and "press button 2."

Figure 5:
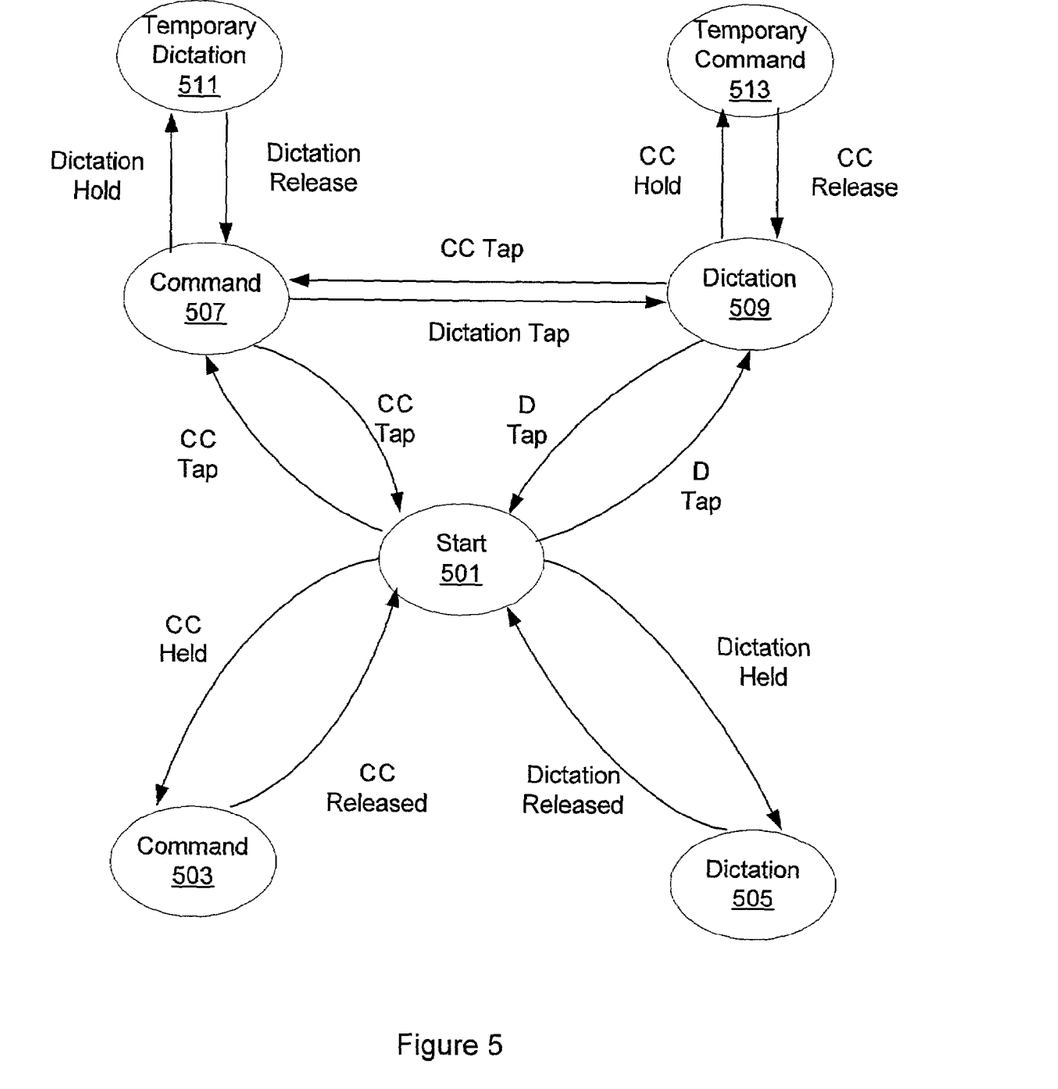

FIG. 5 depicts an example state diagram showing the operation of such a two-button model. In the diagram, a first button is referred to as a command/control (CC) button, while another is referred to as a Dictation button. At the start 501, the speech recognition feature may be in a deactivated state, and the microphone might be deactivated as well. If the CC button is held, the system may enter a command mode 503, during which time detected words may be interpreted as commands. The system may remain in command mode 503 until the CC button is released, at which time the system may return to its beginning state 501. If the Dictation button is pressed and held from the initial state 501, the system may enter dictation mode 505, during which time spoken words may be treated as dictation or text. The system may remain in dictation mode 505 until the Dictation button is released, at which time the system may return to its initial state 501.

From the initial state, if the CC button is tapped, the system may enter command mode 507, during which time spoken words are interpreted as commands. This operation in command mode 507 is the same as that of command mode 503. Similarly, if the Dictation button is tapped from the initial state 501, the system may enter Dictation mode 509, during which time spoken words are interpreted as text. The operation in dictation mode 509 is the same as that of dictation mode 505.

While the system is in command mode 507, if the Dictation button is tapped, the system enters dictation mode 509. Conversely, while the system is in dictation mode 509, a tap to the CC button places the system in command mode 507.

While the system is in command mode 507, it is possible for the user to temporarily enter the dictation mode. This may be accomplished by pressing and holding the Dictation button, causing the system to enter temporary dictation mode 511, which treats spoken words in the same manner as dictation modes 505 and 509. The system exits this temporary dictation mode 511 when the Dictation button is released. Similarly, when the system is in dictation mode 509, the user may cause the system to enter temporary command mode 513 by pressing and holding the CC button. In the temporary command mode 513, spoken words are interpreted as commands, as in command modes 503 and 507. The system leaves temporary command mode 513 upon release of the CC button. The temporary dictation mode 511 and temporary command mode 513 allow the user to quickly and easily alternate between modes.

If the user desires more than a temporary switching of modes, this may be accomplished as well. In command mode 507, a tap to the CC button may cause the system to switch to dictation mode 509. Similarly, a tap to the Dictation button, while in dictation mode 509, may cause the system to switch to command mode 507.

In the FIG. 5 example, the microphone may remain active in all of states 503, 505, 507, 509, 511 and 513. Upon entering (or returning to) initial state 501, the microphone may be deactivated to conserve electrical power. Alternatively, the microphone may remain active to allow use by other programs, or it may remain active for a predetermined period of time (e.g., 1, 2, 5, 10, etc. seconds) before deactivating. Furthermore, although the FIG. 5 example uses taps and holds as the button manipulations, other forms of button manipulation may be used instead. For example, degrees of depression, series of taps and/or holds, rotation of a rotary switch, may be interchangeably used in place of the FIG. 5 taps and holds.

FIGS. 6-10 illustrate an example two-button process flow. From the start 601, the process moves through step 603 when a button input is received. If the button was the command/control button (CC), a check is made in step 605 to determine whether the CC button was tapped or held. If, in step 605, the CC button was tapped, then the process moves to the C&C open microphone mode shown in FIG. 7 and described further below. If, in step 605, the C&C button was pressed and held, then the system may move to the C&C push to talk process shown in FIG. 8 and described further below.

Figure 6:
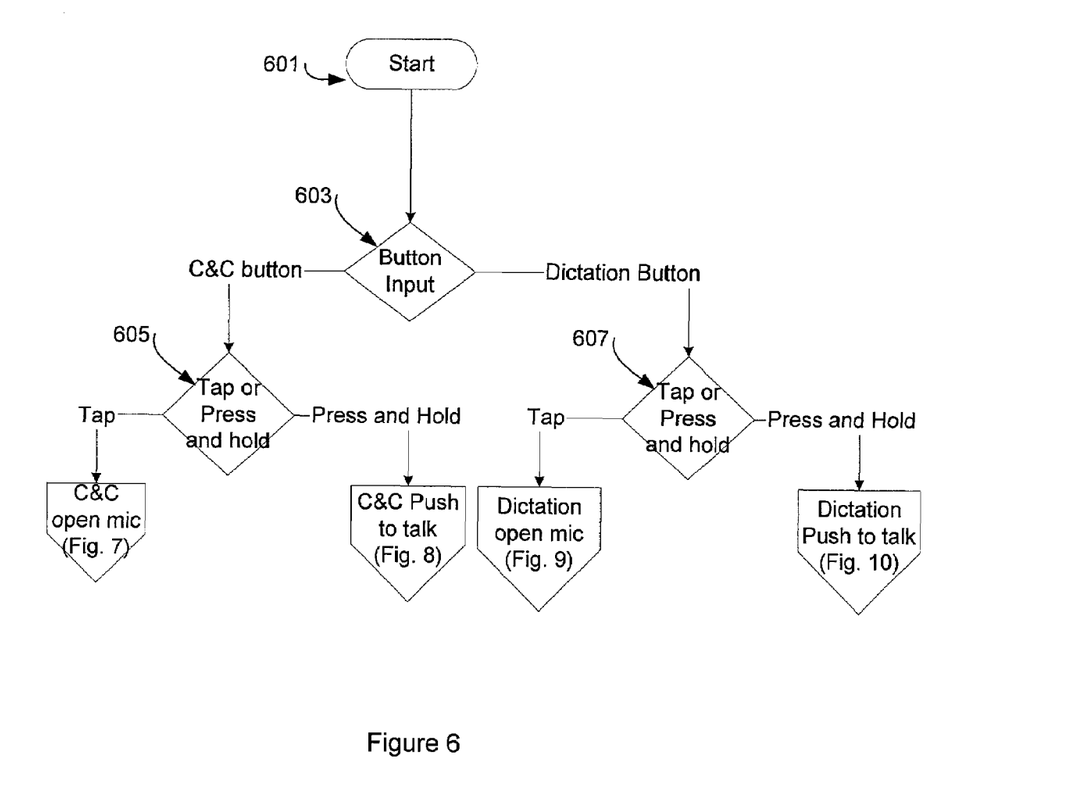
FIGS. 6-10 depict flow diagrams for another two-button aspect of the present invention.

If, in step 603, the Dictation button was pressed or tapped, the process determines what type of input was received in step 607. If, in step 607, the Dictation button is determined to have been tapped, then the process moves to the dictation open microphone process shown in FIG. 9 and described further below. If, in step 607, the Dictation button is determined to have been pressed and held, then the process moves to the dictation push to talk process shown in FIG. 10 and described further below.

Figure 7:
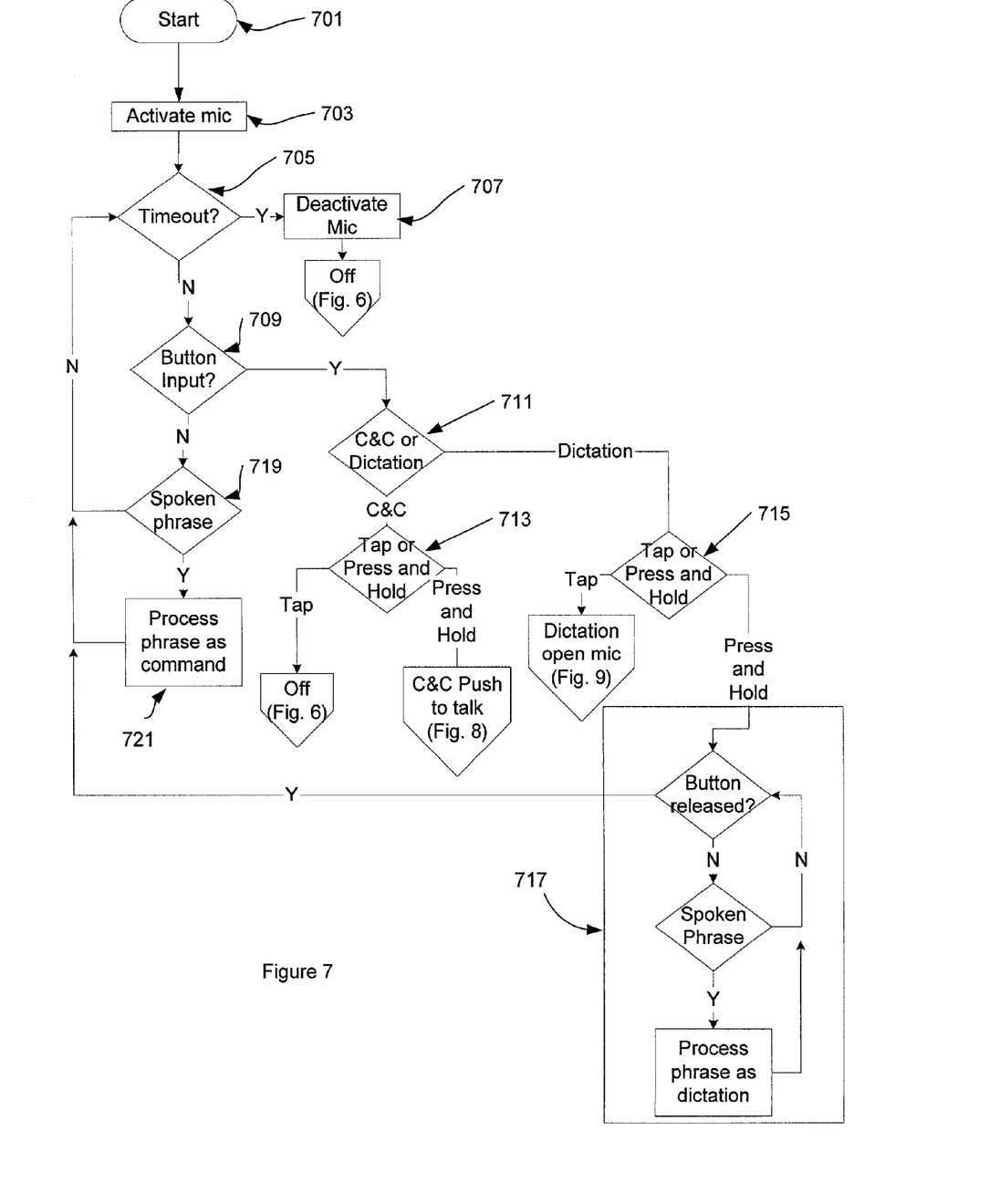

FIG. 7 depicts a command/control open microphone process. In the FIG. 7 model, the system starts in step 701 and activates the microphone in step 703. In step 705, a timer may be consulted to determine whether a predetermined period of time has passed since the last time a spoken word was detected. This predetermined period of time may be a short period of time (e.g. 1, 5, 10, 30 seconds), or a longer period (e.g., 1, 5, 10, 30 minutes) depending on the particular configuration and speaking style of the user, or other factors such as the efficient use of power.

If a timeout has occurred in step 705, then the system may deactivate the microphone in step 707 and return to the initial state process shown in FIG. 6. If, however, no timeout has occurred, then the system checks in step 709 to determine whether a button input was received. If a button input was received, the system determines in step 711 whether a command/control (CC) button or Dictation button was manipulated, and steps 713 and 715 determine whether a tap or hold was received. If a CC button was tapped, then the speech recognition system may simply return to the initial state process shown in FIG. 6. If the CC button was pressed and held, then the system may move to the command/control push to talk process shown in FIG. 8, and described further below. If the Dictation button was tapped, the process may move to the Dictation open microphone process shown in FIG. 9 and described further below. If the Dictation button is pressed and held, then the system may move to step 717, in which spoken words or phrases are processed as dictation while the button remains pressed. Once the Dictation button is released, however, the process returns to step 705.

If no button input is detected in step 709, the system may determine whether spoken words were detected in step 719, and if spoken words have been detected, they may be processed as commands in step 721. After processing the words, or if none were detected, the process may return to step 705.

Figure 8:
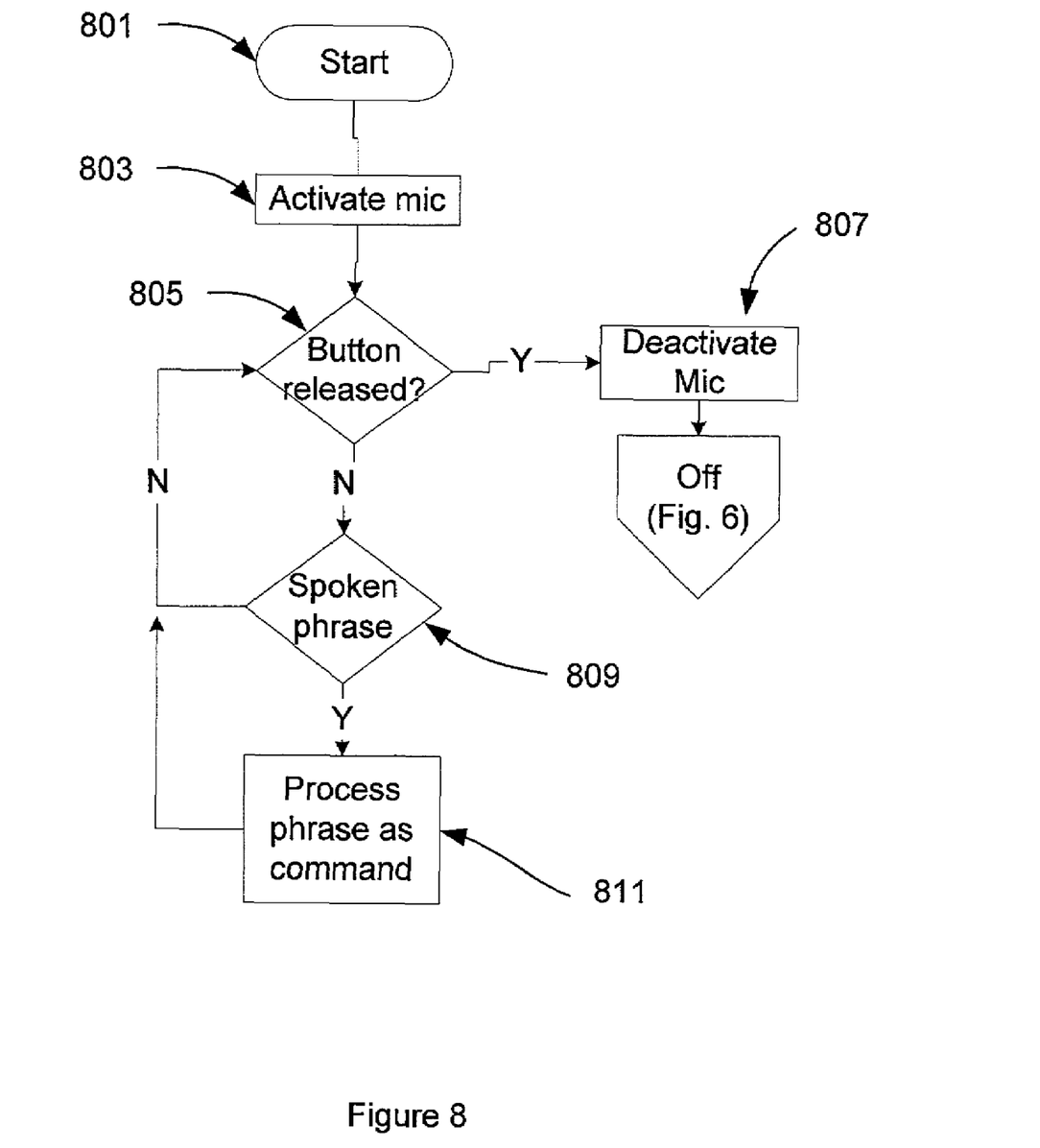

FIG. 8 depicts a command/control push to talk process that may be entered via a press and hold of the CC button from FIGS. 6 or 7. In this process, the microphone may be activated in step 803 to detect spoken words while the CC button is held. In step 805, if the CC button is released, the system may deactivate the microphone in step 807, and proceed to the initial state process shown in FIG. 6.

If, in step 805, the button has not yet been released, the process may check to see if a spoken word phrase has been detected in step 809. If a phrase is detected, then the word or phrase is processed as a command. After processing spoken words in step 811, or if none were detected in step 809, the process returns to step 805.

Figure 9:
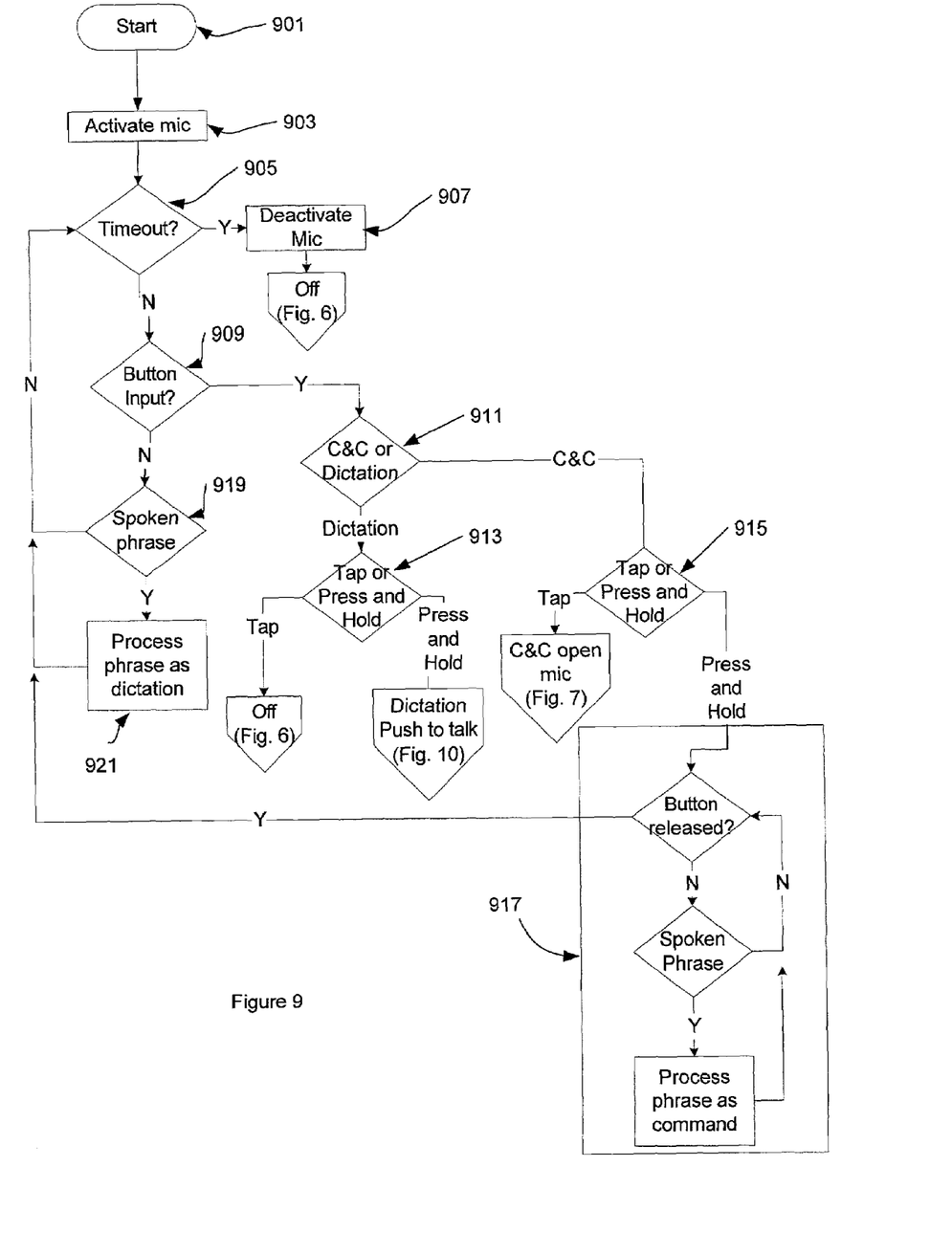

FIG. 9 depicts a dictation open microphone process that is similar to the process shown in FIG. 7. In the FIG. 9 process, the system starts in step 901 and activates the microphone in step 903. In step 905, a timer may be consulted to determine whether a predetermined period of time has passed since the last time a spoken word was detected. This predetermined period of time may be a short period of time (e.g. 1, 5, 10, 30 seconds), or a longer period (e.g., 1, 5, 10, 30 minutes) depending on the particular configuration and speaking style of the user, or other factors such as the efficient use of power.

If a timeout has occurred in step 905, then the system may deactivate the microphone in step 907 and return to the initial state process shown in FIG. 6. If, however, no timeout has occurred, then the system checks in step 909 to determine whether a button input was received. If a button input was received, the system determines in step 911 whether a command/control (CC) button or Dictation button was manipulated, and steps 913 and 915 determine whether a tap or hold was received. If a Dictation button was tapped, then the speech recognition system may simply return to the initial state process shown in FIG. 6. If the Dictation button was pressed and held, then the system may move to the dictation push to talk process shown in FIG. 10 and described further below. If the command/control button was tapped, the process may move to the command/control open microphone process shown in FIG. 7. If the command/control button is pressed and held, then the system may move to step 917, in which spoken words or phrases are processed as commands while the button remains pressed. Once the command/control button is released, however, the process returns to step 905.

If no button input is detected in step 909, the system may determine whether spoken words were detected in step 919, and if spoken words have been detected, they may be processed as dictation in step 921. After processing the words, or if none were detected, the process may return to step 905.

Figure 10:
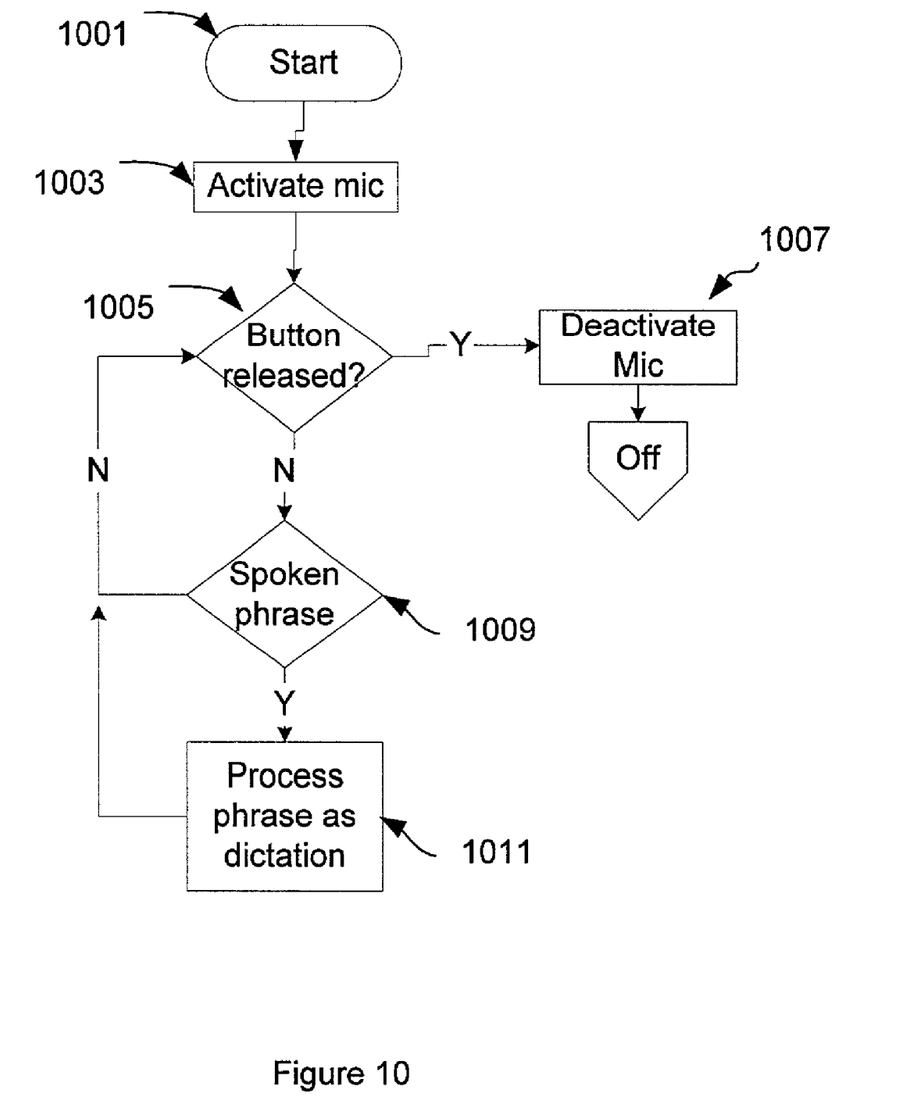

FIG. 10 illustrates a Dictation push to talk process that may be accessed by pressing and holding the Dictation button in FIGS. 6 or 9, and is similar to the command/control push to talk process shown in FIG. 8. In this process, the microphone may be activated in step 1003 to detect spoken words while the Dictation button is held. In step 1005, if the Dictation button is released, the system may deactivate the microphone in step 1007, and proceed to the initial state process shown in FIG. 6.

If, in step 1005, the button has not yet been released, the process may check to see if a spoken word phrase has been detected in step 1009. If a phrase is detected, then the word or phrase is processed as a dictation. After processing spoken words in step 1011, or if none were detected in step 1009, the process returns to step 1005.

The processes described above refer to a CC button and Dictation button, and uses taps and holds of these buttons to control the modes of the speech recognition system. These buttons and manipulations, however, may be modified to suit whatever other form of button is available. For example, sequences of taps and/or holds, multiple stages of depression, rotation of rotary switches, and the like are all forms of input device manipulation that can serve equally well as the buttons, taps and holds discussed above.

In some aspects, the system's microphone might remain in a deactivated state unless a particular button manipulation (such as a press and hold) is received. Upon receiving such a manipulation (such as while the button is pressed and held), a particular default mode may be used to interpret detected words. As depicted above, the default mode may be command or dictation, depending on the user configuration and preference.

The various aspects and embodiments described above may additionally provide feedback to the user to indicate a current mode of speech recognition. For example, a display and/or symbol may appear on the display area 202. The speech recognition software may already provide a user interface, such as a window with graphical buttons, depicting whether the system is in dictation or command mode and/or whether the microphone is activated. The software may allow the user to interact with the graphical interface to change modes, and when the mode is changed as described in FIGS. 3 and/or 4, the graphical user interface may be updated to reflect the change. One or more lighting devices 208, such as light-emitting diodes, may also provide such feedback. For example, a light 208 might be one color to indicate one mode, and another color to indicate another mode. The light 208 may be turned off to indicate the microphone and/or the speech recognition functionality has been deactivated. Alternatively, the light 208 may blink on and off to acknowledge a change in mode. The light may illuminate to indicate received audio signals and/or complete spoken words or phrases. Feedback may be provided using audible signals, such as beeps and/or tones.

A single button may be used to control the activation status of a microphone. For example, tapping the button may toggle the activation status of the microphone between on and off states, while pressing and holding the button may cause a temporary reversal of the microphone state that ceases when the button is no longer held. Such a microphone control may be advantageous where, for example, a user is about to sneeze during a dictation in which the microphone is activated. Rather than having his sneeze possibly recognized as some unintended word, the user might press and hold the button to cause the microphone to temporarily deactivate. Conversely, the user may have the microphone in an off state, and wish to temporarily activate the microphone to enter a small amount of voice input. The user may press and hold the button, activating the microphone while the button is held, and then deactivate the microphone once again when the button is released.

In a further aspect, a variety of other user inputs may be used to initiate the various steps described above, such as a button depression or depression sequence, proximity to a proximity-sensitive button (e.g., hovering over an onscreen graphical button, or near a capacitive sensor), or audio inputs such as predefined keywords, tones, and/or sequences.

The user's device may be configured to dynamically reassign functionality for controlling the speech recognition process. For example, a device might originally follow the FIG. 3 method, using a single button for each mode. If desired, the device may dynamically reconfigure the button controls to change from the FIG. 3 method to the FIG. 4 method, where taps and press and holds result in different behavior. This change may be initiated, for example, by the user through entry of a command. Alternatively, such a change may occur automatically to maximize the resources available to the device. To illustrate, a device may originally use two buttons (e.g., one for dictation mode and one for command mode, replacing the "tap" and "press" functionality in FIG. 3), and then switch to a single button mode using the FIG. 3 method to allow the other button to be used for a different application.

Although various aspects are illustrated above, it will be understood that the present invention includes various aspects and features that may be rearranged in combinations and subcombinations of features disclosed. The scope of this invention encompasses all of these variations, and should be determined by the claims that follow.

We claim:

1. A method for use in a computing device having a microphone and a button, comprising the steps of:
   activating said microphone;
   receiving a user input on said button,
   placing said device in an operating mode corresponding to a dictation mode when said user input is of a first type;
   modifying the operating mode to place said device in a command mode when said user input is of a second type; wherein said device identifies spoken words as text in said dictation mode, and as commands in said command mode; and
   providing an indication either visually or audibly to a user of said device as to whether said device is in said dictation mode or said command mode prior to identifying spoken words as text or commands,
   wherein the user can enter a temporary mode, which is one of either a dictation mode or a command mode, different from the mode the user is currently presiding by pressing and holding down said button, where the user stays in the temporary mode for the duration the button is held down and exits the temporary mode upon releasing of the button, which causes the user to enter back into the current mode.

2. The method of claim 1, wherein said first type of user input actuating said button is a tap of said button.

3. The method of claim 1, wherein said first type of user input actuating said button is a rotation of said button.

4. The method of claim 1, wherein said button is a graphical user interface button.

5. The method of claim 1, wherein said indication is provided on a display of said device.

6. The method of claim 1, wherein said indication is provided by a lighting element of said device external to a display area.

7. The method of claim 1, wherein said indication is provided as an audible signal.

8. The method of claim 1, wherein said button has multiple states of depression, and said first and second types of user input actuating said button are first and second states of depression of said button.

9. The method of claim 1, further comprising the step of deactivating said microphone responsive to a manner in which said button is depressed.

10. The method of claim 1, further comprising the step of deactivating said microphone upon the expiration of a predetermined time period during which no spoken words are identified.

11. A computer-readable medium having computer-executable instructions for performing the steps recited in claim 1.

12. The method of claim 1, wherein after a predetermined amount of time, if spoken words are note detected, the microphone is deactivated and the system exits the current mode.

13. The method of claim 1, wherein said first type of user input actuating said button is a press and release of said button.

14. The method of claim 13, wherein said second type of user input actuating said button is a press and hold of said button.

15. The method of claim 1, wherein said device is toggled between said dictation mode and said command mode if said button is actuated by pressing and releasing.

16. The method of claim 15, wherein said device identifies spoken words while said button is actuated by pressing and holding.

17. A personal computing device, comprising:
   a processor;
   a memory;
   a display, communicatively coupled to said processor;
   a microphone, communicatively coupled to said processor;
   a button, communicatively coupled to said processor;
   a speech-recognition program, stored in said memory, for causing said processor to recognize audible sounds detected by said microphone;
   a first program module, stored in said memory, for causing said processor to activate said microphone;
   a second program module, stored in said memory, for causing said processor to enter an operating mode corresponding to a command mode responsive to said button being pressed in a first manner and notifying a user either audibly or visually of entering said command mode; and
   a third program module, stored in said memory, for causing said processor to modify the operating mode to correspond to a dictation mode responsive to said button being pressed in a second manner, and notifying a user either audibly or visually of entering said dictation mode, wherein spoken words recognized in said dictation mode are handled by said processor as textual data, and spoken words recognized in said command mode are handled by said processor as commands requiring execution of one or more additional functions,
   wherein the user can enter a temporary mode, which is one of either a dictation mode or a command mode, different from the mode the user is currently presiding by pressing and holding down said button, where the user stays in the temporary mode for the duration the button is held down and exits the temporary mode upon releasing of the button, which causes the user to enter back into the current mode.

18. The device of claim 17, wherein said first speech-recognition program, first program module, second program module, and third program module, are all part of a single computer program.

19. The device of claim 17, wherein said second program module causes said processor to enter said command mode if said button is pressed and held.

* * * * *